United States Patent Office 2,915,437
Patented Dec. 1, 1959

2,915,437
METHOD OF CONTROLLING BRUCELLOSIS

Victor Richard Berliner, North Branch, and Heron O. Singher, Plainfield, N.J., assignors to Ortho Pharmaceutical Corporation, a corporation of New Jersey No Drawing. Application May 11, 1956
Serial No. 584,187

15 Claims. (Cl. 167—78)

This invention relates to the control of brucellosis and more particularly to a vaccine rich in antigens effective in providing immunity against brucellosis and to the method of preparing the same.

Brucellosis is an infective disease of cattle, swine, and goats and is caused by bacteria of the Brucella group. This manifests its presence in animals by inducing premature abortion of the fetus, thereby causing economic losses to the live-stock breeder not only through the loss of the offspring but in the case of dairy cows also through a greatly reduced production of milk.

Brucellosis constitutes a serious hazard to the human population because the infective organisms can be passed on to man by contact with the meat of infected animals or through consumption of infected milk. The disease in man is also called brucellosis although the older nomenclature "undulant fever," derived from the typical symptoms of undulating attacks of fever, is still in use. Brucellosis in man and cattle is also referred to as "Bang's disease" after Bang, who in 1897 discovered the connection between the causative bacillus and abortion in cattle.

Different types of Brucella bacillus have been classified according to their principal hosts. *Brucella abortus* is the organism causing principally the disease in cattle; *Brucella suis*, or *Porcine brucella* is the type responsible for the disease in swine; and *Brucella melitensis* is the micro-organism harbored by goats.

Cross infection between these species do occur, however, and all three are pathogenic. Pathogenicity in man varies. *Brucella melitensis* is the most dangerous, the disease terminating frequently in death. The term, "Malta fever," originally given by Bruce to a disease that seemed to be specific to the island of Malta, is now reserved for the type of disease caused specifically by *Brucella melitensis*. *Brucella abortus*, the bovine type, is considered the least pathogenic, rarely terminating fatally, but it is believed that unrecognized infections with *Brucella abortus* are responsible for many debilitating conditions in man predisposing to other more serious diseases, such as rheumatic fever, endocarditis and others. Public Health Departments in many States consider the consumption of Brucella infected milk as such a danger to general health that in many States starting with 1958, only those herds will be allowed to sell milk that are free from Brucella infected cattle.

It is an object of our invention to provide a vaccine rich in antigens that will create a state of immunization against Brucella bacteria.

It is a further object of our invention to provide a vaccine that is free of living bacteria. Still another object of our invention is to provide a vaccine against brucellosis that will not interfere with the agglutination test presently used in the testing of herds.

At the present time, there are two well-known methods for combating Brucella infection in cattle. One program is the elimination of infected animals by the regular testing of herds for animals that are positive to the agglutination test. Animals which give a positive test are called reactors and these animals are slaughtered. Although herds and even entire areas are occasionally free of reactors, this state can never become permanent as any animal can pick up brucellosis organisms from infected water, from the soil, by contact with infected litter in trucks, by carrier birds and stray dogs. It is a drawback of the rigid elimination process that the remaining animals may not develop a natural immunity. Thus when a herd is exposed to infection, a severe outbreak of the disease with abortions in as high as 70 percent of the animals may occur.

The second method of controlling brucellosis to be attempted was a systematic vaccination of calves. This program is based on the knowledge that the sexually immature calf has a natural immunity against brucellosis. By vaccinating calves at the age of 4 to 8 months, a protection against infection is conferred on these animals because their immunity mechanism is stimulated by the living organisms; yet, at breeding age the bacteria themselves are no longer present. A special strain of *Brucella abortus* developed by the United States Department of Agriculture and identified as Strain 19 is used in the calf vaccination program. Strain 19 has very low virulence but is highly antigenic. The closer to onset of sexual maturity, the more effective the immunity, but also the greater is the risk that the calf will not throw off the living bacteria and instead will become a carrier. The calf vaccinated just prior to maturity will also retain a high antibody titer that is confusing to the present test program.

Originally, a titer of 1:50 in a calfhood vaccinated animal was attributed to antibodies caused by the vaccination and such an animal was considered as non-infected, whereas in an unvaccinated animal this titer would classify it as suspect. The occurrence in vaccinates of a titer of 1:100 was so frequent that since 1955, this titer in vaccinated animals is assumed to be due to a high degree of immunity and not due to infection. The correctness of this assumption is still disputed by many workers, especially in view of the fact that a titer of 1:100 is often found in non-vaccinated cows that abort.

The primary disadvantage of the calfhood vaccination program is that the immunity conferred to the young calf by vaccination does not last throughout its productive life. After three of four pregnancies, the rate of infection even in vaccinated animals is quite high, sometimes reaching 20 to 40 percent in a herd.

Revaccination with Strain 19 vaccine of adult cows that have lost their immunity would considerably cut down the incidence of abortion in a herd, but some vaccinated animals would become carries and would be infected even though they did not abort. Such cows would shed Brucella organisms in their milk and therefore be a serious health hazard. There is some evidence that with a change of host, the originally low virulence and pathogenicity of Strain 19 to cattle reverts to a high virulent form in man.

Vaccination of calves with Strain 19 is, at the present time, the only officially recognized and permitted procedure in spite of its great drawbacks, its greatest handicap being that in careless hands and under careful management alike it contributes to a continuous dissipation of living Brucella organisms.

It has been realized for some time that maintenance of the natural defense would be the ideal method of controlling brucellosis. This defense system is the immunogenic system of the body. How it occurs is not known in detail, but it is known that exposure to an infection with certain bacteria does create a state of immunity. The created immunity can work in two ways: It can protect against infection by the organisms and their permanent establishment in the body (anti-infective effect), or it can merely protect the body against the immediate damage caused by established bacteria (anti-toxic effect). In the case of brucellosis, the latter would apply to the occurence of abortion itself, the former to the animal becoming a carrier.

Attempts to develop a known living vaccine go back to the time when Bang made his original discovery. The use of bacterins made from killed bacteria is by no means new, and in many diseases they are effective, even though they do not provide a long lasting protection. In bovine brucellosis, vaccination with killed bacteria has not been successful. In the light of present knowledge, it seems possible that in the early attempts the bacteria were treated too vigorously. When bacteria were killed by heat or by certain chemicals, the antigenically active systems in the bacteria were altered to such an extent that the specific antigens involved in producing protection against brucellosis were destroyed. The usual procedure was boiling or even autoclaving, or suspension in phenol in concentrations above 0.5 percent or in formalin of 0.25 percent or higher. Usually the original bacterial suspension was centrifuged, the supernatant liquid discarded, and the resuspended bacteria used for the preparation of bacterins. Brucellosis bacteria have been killed by irradiation with ultraviolet light, with ether, and by sonic disintegration.

We have now discovered a process for isolating antigenic material from the Brucella organism with which the anti-infective anti-toxic immunizing systems can be sensitized. In this respect, our antigenic material imitates the conditions that exist when the cattle are exposed to low grade natural infection which they can throw off without becoming permanently infected. Our vaccine may be administered at yearly intervals, and the vaccinated animal may be readily distinguished from an infected animal since the agglutination test on a vaccinated animal differs markedly in a manner to be described below.

We have now found that extraction of Brucella with an aqueous alkaline solution having a pH greater than 7 but less than 11 and having an ionic strength less than about 0.3 provides a bacterial suspension rich in antigens. The suspension so obtained may be filtered to remove all bacteria. Antigens, however, pass through the filter and are present in the filtrate. An aqueous sodium carbonate solution containing from about 0.5 percent to about 1.0 percent by weight sodium carbonate (pH—10 to 11) is particularly effective in extracting antigens from Brucella. The extract may be collected, held for 24 hours at 5° C., and then frozen solid. After thawing, the bacteria are separated by centrifuging, and the supernatant liquid is filtered through a sterilizing filter. No preservatives are required and the filtrate obtained by this process is sterile.

Control tests before centrifugation show that the bacteria are not dead at this stage but they do die off gradually if left in contact with the sodium carbonate solution for several days. The freezing step described above is of some aid in distintegrating the bacteria, but it is not absolutely necessary as the antigen may be extracted with the sodium carbonate solution even though the freezing step is omitted. The preferred method of preparing a vaccine according to our invention is described in the following examples.

EXAMPLE I

Forty-nine grams of a dehydrated potato infusion agar manufactured by the Difco Laboratories of Detroit, Michigan, was added to 1000 ml. of distilled water containing 2 percent glycerol. The mixture was heated to boiling with stirring to dissolve the agar, and approximately 200 cc. portions of the solution so obtained was introduced into individual one quart culture (Roux) bottles. These bottles were closed with cotton stoppers and sterilized for 15 minutes at 15 percent steam pressure (121° C.). Each of the bottles containing the agar medium was then innoculated with aproximately 5 cc. of a heavy suspension of living Brucella abortus (S-form). The bottles were resealed and incubated for three days at 37.5° C.

The bacterial growth was washed off the agar surface with about 100 cc. of 1 percent aqueous sodium carbonate solution and decanted into a centrifuge bottle. The bottle containing the extract was stored at room temperature for 24 to 48 hours, during which time the antigens associated with the Brucella abortus passed into solution. At the end of 48 hours, the bottle containing the extract was centrifuged and the supernatant liquid decanted from the bacteria. The extract was then passed through a Seitz sterilization filter under low pressure.

The Seitz filter is asesmbled with a filter element having a maximum pore size of about 0.1 micron. Suitable filters for this use are manufactured by Hercules under the designation ST filter and ST-3 filter. These filters retain all Brucella bacteria and inasmuch as the entire filter is autoclaved prior to use, the affluent from the filtering step is sterile. The affluent from the filtration step amounts to about 80 ml. and may be tested for sterility on culture plates. The filtrate has a high antigenic activity and may be used directly as a vaccine against brucellosis with no change in concentration. This vaccine is stable over a period of years when stored at a temperature of above 5° C. The vaccine contains catalase and proteinaceous material which has mobilities between $-5.9 \times 10^{-5}$ and $-1.0 \times 10^{-5}$ centimeters per second per volt per centimeter when tested with a pH 8.6 0.05 molar veronal buffer.

The vaccine prepared according to the method of Example I above was injected in amounts ranging from 5 to 40 cc. subcutaneously in the neck of sows that were negative to the agglutination test. All developed titers of 1:100 within 7 to 10 days.

However, it should be emphasized that the vaccinated animals can be distinguished from the unvaccinated infected animals by subtle differences in the agglutination test. Whereas blood serum from an infected animal is normally observed to cause coagulation of clumping of dead bacteria added thereto; the blood serum from a vaccinated (non-infected) cow gives a precipitate, the particles of which are unmistakably smaller in size. Moreover, when the agglutination test is made in the standard way by placing a small amount of serum on a glass plate, these finely divided particles migrate to the edge of the serum pool leaving the center portion clear. By contrast, the larger particles of precipitate recognized as a positive test for an infected animal do not migrate but remain evenly dispersed throughout the serum pool.

All cows were kept in one group and had an equal chance of exposure. Within a month, the titer dropped to 1:50 or lower with the exception of those that received the large amount of 40 cc. In a few cases, indurations of short persistance appeared at the sight of injection but not a single instance of abscess formation was noted. Only one cow had a general systemic reaction lasting a few days. If desired the vaccine may be administered together with polyvinyl pyrrolidone or polyvinyl methyl ether or other adjuvants that produce a depot effect.

RESULTS OF VACCINATIONS OF COWS WITH VACCINE OF EXAMPLE I

Table I

EXTRACTED WITH 1% SODIUM CARBONATE

| Cows | Amount, cc. | Results |
|---|---|---|
| 1. Red Poll | 20 | Vaccinated; negative after 2 years. |
| 2. Red Poll | 20 | Do. |
| 3. Red Poll | 40 | Vaccinated; deep intramuscular vaccination, aborted seven months and seventeen months after vaccination; became negative three months later. |
| 4. Red Poll | 40 | Vaccinated; negative after 2 years. |
| 5. Red Poll | 20 | Do. |
| 6. Hereford | 10 | Vaccinated; negative until removed from test herd. |
| 11. Red Poll | 5 | Vaccinated; negative after 1 year. |
| 13. Red Poll | 5 | Do. |
| 24. Red Poll | 5 | Vaccinated; became suspect after 1 year (after calving); returned to negative 1 month later. |
| 25. Red Poll | 5 | Vaccinated; negative for 1½ years, then revaccinated. |
| 30. Red Poll | 5 | Do. |
| 31. Red Poll | 5 | Do. |
| 32. Red Poll | 5 | Do. |
| 29. Angus | 5 | Vaccinated; negative for 1 year ten months, then infected artificially, no rise of titer. |
| 16-6. Guernsey | 10 | Vaccinated; artificially infected after five months; reactor after seven months; negative after 1 year, calved normally; remained negative for 2½ years. |
| 11. Holstein | 10 | Vaccinated; artificially infected after 1 year two months; remained negative for 2½ years; removed from test herd. |
| 13. Holstein | 10 | Vaccinated; artifically infected after 1 year two months; became suspect two weeks later; returned to negative about one and one-half months after artificial infection; removed from test herd after 2½ years. |
| 14. Holstein | 10 | Vaccinated; artificially infected after 1 year two months; reactor two weeks later; negative one and one-half months after artificial infection. |
| 18. Holstein | 10 | Vaccinated; artificially infected after four and one-half months and five months; remained negative. |
| 19. Cows—Total | | Summary—1 reactor=5.2% infection rate. |

Table II

CONTROLS—NOT VACCINATED

| Cows | Results |
|---|---|
| 21. Red Poll | Became reactor within two months; aborted at the end of eleven months. |
| 29. Red Poll | Became reactor within five months. |
| 36. Red Poll | Became reactor within five months and aborted. |
| 37. Red Poll | Became reactor within four months and aborted. |
| 6. Red Poll | Became reactor after ten months. |
| 34. Angus | Remained negative. |
| 9. Guernsey | Remained negative after one year. |
| 7. Cows—Total | Summary—5 reactors=71.4% infection rate. |

Within the herd, 50 percent of the untreated controls became reactors (within 10 months) and some aborted. Brucella was recovered from the uterus, the placenta, and in the milk. Those cows vaccinated with the sodium carbonate extract were completely free of infection at the end of two years and one cow has remained negative for four years. The effectiveness of vaccination with the vaccine of Example I is summarized in Table I. Table II summarizes the results observed in the control herd.

EXAMPLE II

The process of Example I was repeated but a 0.4% aqueous solution of sodium hydroxide was substituted for the sodium carbonate solution of Example I. The presence of antigenic material in the dilute caustic solution was established by filtering off the Brucella and vaccination of cows with the filtrate. Cows so vaccinated gave a positive blood test (agglutination test) within ten days. The finely divided precipitate obtained in this test however was indicative of vaccination rather than active infection.

While the invention has been described in great detail in the foregoing description, such detail was to be considered as illustrative only and not restrictive in character.

What is claimed is:

1. A method of preparing immunizing antigens effective in the vaccination of cattle which comprises the steps of extracting a living Brucella culture with an aqueous alkaline solution, having a pH greater than 7 and less than 11, and separating the bacteria from the aqueous alkaline solution.

2. A method of preparing immunizing antigens effective in the vaccination of cattle which comprises the steps of extracting a living *Brucella abortus* culture with an aqueous alkaline solution having a pH greater than 7 and less than 11 and separating the bacteria from the aqueous alkaline solution.

3. A method of preparing immunizing antigens effective in the vaccination of cattle which comprises the steps of extracting a living Brucella culture with an aqueous sodium carbonate solution having a pH greater than 7 and less than 11 and separating the bacteria from the aqueous sodium carbonate solution.

4. A method of preparing immunizing antigens effective in the vaccination of cattle which comprises the steps of extracting a living Brucella culture with an aqueous alkaline solution having a pH greater than 7 and less than 11 and containing from about 0.5 percent to 1.0 percent sodium carbonate and separating the bacteria from the aqueous sodium carbonate solution.

5. A method of preparing immunizing antigens effective in the vaccination of cattle which comprises the steps of extracting a living Brucella culture with an aqueous sodium carbonate solution having a pH greater than 7 and less than 11 at a temperature between 2° C., and 37° C.; centrifuging the aqueous sodium carbonate extract to remove bacteria therefrom, and filtering the supernatant liquid through a sterilizing filter.

6. A method of immunizing cattle against brucellosis which comprise injecting a sterile antigen solution obtained by extracting a living Brucella culture with an aqueous alkaline solution having a pH greater than 7 and less than 11, and separating the bacteria from the aqueous alkaline solution.

7. A method of immunizing cattle against brucellosis which comprises injecting a sterile antigen solution obtained by extracting a living *Brucella abortus* culture with an aqueous alkaline solution having a pH greater than 7 and less than 11 and separating the bacteria from the aqueous alkaline solution.

8. A method of immunizing cattle against brucellosis which comprises injecting a sterile antigen solution obtained by extracting living Brucella micro-organisms with an aqueous sodium carbonate solution having a pH greater than 7 and less than 11 and separating the bacteria from the aqueous sodium carbonate solution.

9. A method of immunizing cattle against brucellosis which comprises injecting a sterile antigen solution obtained by extracting at a temperature between 2° C., and 37° C., living Brucella micro-organisms with an aqueous sodium carbonate solution having a pH greater than 7 and less than 11 and separating the bacteria from the aqueous sodium carbonate.

10. A sterile antigen effective in providing immunity in cattle against brucellosis prepared by extracting a living Brucella culture with an aqueous alkaline solution having a pH greater than 7 and less than 11 and separating the bacteria from the aqueous alkaline solution.

11. A sterile antigen effective in providing immunity against brucellosis in cattle prepared by extracting living *Brucella abortus* micro-organisms with an aqueous alkaline solution having a pH greater than 7 and less than 11 and separating the bacteria from the aqueous alkaline solution.

12. A sterile antigen effective in providing immunity against brucellosis in cattle prepared by extracting living Brucella micro-organisms with an aqueous alkaline solution having a pH greater than 7 but less than 11 and an ion strength less than 3 and separating the bacteria from the aqueous alkaline solution.

13. A sterile antigen effective in providing immunity against brucellosis in cattle prepared by extracting living Brucella micro-organisms with an aqueous sodium carbonate solution having a pH greater than 7 and less than 11 and separating the bacteria from the aqueous sodium carbonate solution.

14. A sterile antigen solution effective in providing immunity against brucellosis in cattle prepared by extracting living Brucella micro-organisms with an aqueous solution having a pH greater than 7 and less than 11, separating the bacteria from the aqueous alkaline solution, and adding to the aqueous alkaline solution polyvinyl pyrrolidone.

15. A sterile antigen solution effective in providing immunity against brucellosis in cattle prepared by extracting living Brucella micro-organisms with an aqueous solution having a pH greater than 7 and less than 11, separating the bacteria from the aqueous alkaline solution, and adding to the aqueous alkaline solution polyvinyl methyl ether.

References Cited in the file of this patent

UNITED STATES PATENTS 2,682,492 Huddleson ------------- June 29, 1954

OTHER REFERENCES

Chem. Abstr., vol. 32, 1938, pp. 6376, 6377.

Chem. Abstr., vol. 48, 1954, p. 4099.

Topping: J. Path. of Bact., vol. 39, 1934, pp. 665–668.

Pop et al.: Compt Rendue de La. Soc. de Biologie, vol. 127, 1938, pp. 733–738.

Huddleson: "Brucellosis in Man and Animals," 1943, pp. 146–151, 239–240, 245–246, 248 and 257–260.

Dubos: The Bacterial Cell, pub. 1955, by Harvard Univ. Press, Cambridge, Mass., pp. 104–110, 196, 243, 248.

Kabat et al.: "Exptl. Immunochem.," pub. 1948 by C. C. Thomas, Springfield, Ill., pp. 72 and 441.

UNITED STATES PATENT OFFICE
CERTIFICATE OF CORRECTION

Patent No. 2,915,437 December 1, 1959

Victor Richard Berliner et al.

It is hereby certified that error appears in the printed specification of the above numbered patent requiring correction and that the said Letters Patent should read as corrected below.

Column 4, line 48, for "sows" read -- cows --.

Signed and sealed this 17th day of May 1960.

(SEAL)
Attest:

KARL H. AXLINE
Attesting Officer

ROBERT C. WATSON
Commissioner of Patents